(12) United States Patent
Lo

(10) Patent No.: US 7,293,149 B2
(45) Date of Patent: Nov. 6, 2007

(54) METHOD AND APPARATUS FOR DETERMINING A STATUS OF AN ASYNCHRONOUS MEMORY

(75) Inventor: John Lo, Fremont, CA (US)

(73) Assignee: Sun Microsystems Inc., Santa Clara, CA (US)

( * ) Notice: Subject to any disclaimer, the term of this patent is extended or adjusted under 35 U.S.C. 154(b) by 937 days.

(21) Appl. No.: 10/448,826

(22) Filed: May 30, 2003

(65) Prior Publication Data

US 2004/0255188 A1    Dec. 16, 2004

(51) Int. Cl.
G06F 12/00 (2006.01)

(52) U.S. Cl. .................................................... 711/167

(58) Field of Classification Search ................ 711/167, 711/110; 710/57
See application file for complete search history.

(56) References Cited

U.S. PATENT DOCUMENTS 5,426,756 A    6/1995 Shyi et al.
6,263,410 B1 *  7/2001 Kao et al. .................... 711/156
6,389,490 B1 *  5/2002 Camilleri et al. ............. 710/57

* cited by examiner

Primary Examiner—Hiep T. Nguyen
(74) Attorney, Agent, or Firm—Park, Vaughan & Fleming LLP

(57) ABSTRACT

A method and apparatus for facilitating the determination of a status of an asynchronous memory (e.g., how full or empty the memory is). A write pointer to the memory is maintained in a first clock domain; a read pointer is maintained in a second clock domain. The pointers are maintained in a non-binary code format promoting minimum bit transitions as the pointers increment (e.g., Gray code). Each pointer is transmitted to the other clock domain through synchronizers. Each synchronizer comprises multiple sets of D flip-flops. In each clock domain, the write pointer and read pointer values are converted to mathematically useful formats (e.g., binary), and their difference is calculated. The difference indicates how much space in the memory is or is not used, and may be compared to a non-zero threshold.

36 Claims, 3 Drawing Sheets

METHOD AND APPARATUS FOR DETERMINING A STATUS OF AN ASYNCHRONOUS MEMORY

BACKGROUND

This invention relates to the field of computer systems. More particularly, an apparatus and method are provided for reliably transferring a value (e.g., a counter or index value) from one clock domain to another clock domain.

In many computer systems, components such as communication interfaces, processors, memory modules, and so on, must communicate with other components asynchronously (i.e., across clock domain boundaries). A clock domain may comprise any number of components, or any amount of circuitry, operating under one clock reference.

When transmitting information from one clock domain to another, because the sender's and receiver's clocks are not synchronized, the receiver may encounter difficulty reading the information correctly. For example, when the communication path comprises multiple bits (e.g., a 16-bit, 32-bit or 64-bit bus), if the information is transmitted in binary code, several bits may transition during each pulse. If the receiver attempts to read or latch onto the sender's signal while multiple bits are transitioning, the receiver may observe an incorrect value.

Attempts have been made to send information across clock domains in a format other than binary. However, because the information is not received in binary or other mathematically meaningful format, it cannot be readily used in calculations. For example, it may be necessary to transmit a read or write pointer value (e.g., an index) from one clock domain to another. If the information is not passed in binary format, it cannot be readily used for comparison, to determine whether the indexed structure is full or empty.

Therefore, what is needed is an apparatus and method for reliably transferring a value across clock domains so that when it is received, it can be used in a mathematical computation.

SUMMARY

In one embodiment of the invention, a method and apparatus are provided for facilitating the determination of a status of an asynchronous memory (e.g., how full the memory is). A write pointer into the memory (or, alternatively, a counter or index) is maintained in a first clock domain; a read pointer into a second clock domain (or, alternatively, a counter or index) is also maintained. In this embodiment, the pointers are non-binary values configured to promote minimum bit transitions as the pointers increment. For example, they may comprise Gray codes. The write and read pointers are transmitted to the other clock domain through synchronizers. Each synchronizer comprises multiple sets of flip-flops.

In each clock domain, the write pointer and read pointer values are easily converted to mathematically useful formats (e.g., binary), and their difference is calculated. The difference indicates how much space in the memory is not used, and may be compared to a non-zero threshold.

DETAILED DESCRIPTION

Figure 1:
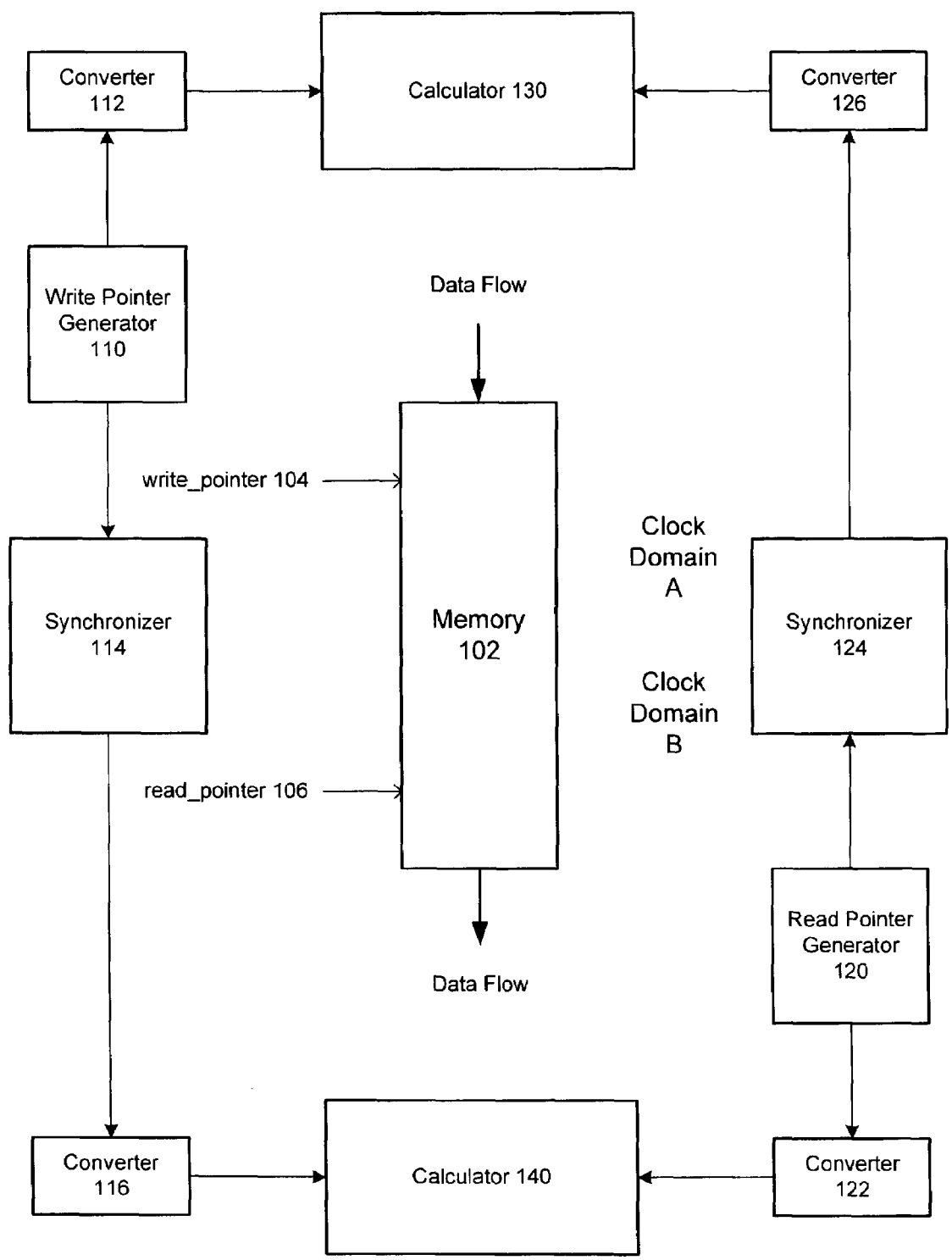
FIG. 1 is a block diagram depicting an apparatus for communicating a value across clock domains for use in a mathematical calculation, in accordance with an embodiment of the present invention.

The following description is presented to enable any person skilled in the art to make and use the invention, and is provided in the context of particular applications of the invention and their requirements. Various modifications to the disclosed embodiments will be readily apparent to those skilled in the art and the general principles defined herein may be applied to other embodiments and applications without departing from the scope of the present invention. Thus, the present invention is not intended to be limited to the embodiments shown, but is to be accorded the widest scope consistent with the principles and features disclosed herein.

The program environment in which a present embodiment of the invention is executed illustratively incorporates a general-purpose computer or a special purpose device such as a hand-held computer. Details of such devices (e.g., processor, memory, data storage, communication interface, display) may be omitted for the sake of clarity.

It should also be understood that the techniques of the present invention may be implemented using a variety of technologies. For example, the methods described herein may be implemented in software executing on a computer system, or implemented in hardware utilizing either a combination of microprocessors or other specially designed application specific integrated circuits, programmable logic devices, or various combinations thereof. In particular, the methods described herein may be implemented by a series of computer-executable instructions residing on a suitable computer-readable medium. Suitable computer-readable media may include volatile (e.g., RAM) and/or non-volatile (e.g., ROM, disk) memory.

In an embodiment of the invention, an apparatus and method are provided for transmitting, from one clock domain to another, a pointer or place-keeping value (e.g., an index or counter) into a memory. Each domain comprises logic or circuitry operating according to a different clock reference.

Illustratively, the received pointer value is used to calculate how full or empty the memory is (e.g., how many storage positions are still available or how many storage positions are unused). The memory is shared between the domains. In particular, it may be written to in one domain, and read from in the other.

The memory may be used to store virtually any type of data, which may be stored in the memory in virtually any form. Illustratively, the memory may be implemented as a circular FIFO (First-In, First-Out) queue, a stack, or may allow random access.

In an embodiment of the invention, a write pointer to a memory shared between clock domains is maintained in a first domain. A read pointer is maintained in a second domain. Because each domain operates under a different clock frequency, they cannot simply transmit their pointer values across the domain boundary. However, each domain may use the pointers to calculate how full or empty the memory is. For example, each domain may calculate the difference between the pointers in the form (wp−rp), where "wp" refers to the address, counter or index of the write pointer and "rp" refers to the address, counter or index of the read pointer. The resulting value may indicate how many storage positions in the memory are unfilled.

The pointer values may be of any magnitude (e.g., 8, 16, 32 bits), and the memory may be of any size (i.e., may or may not be aligned with a power of two).

FIG. 1 is a block diagram depicting an apparatus for transferring memory pointer values across a clock domain boundary, according to one embodiment of the invention. Although this embodiment depicts the transfer of two pointer values across a single boundary between two clock domains, the apparatus may be modified to allow any number of values to be transferred across any number of boundaries, without exceeding the scope of the invention. The apparatus of FIG. 1 may comprise a communication interface or other expansion card, an integrated circuit, a computer, a route, a processor, or some other device. The apparatus may employ wired and/or wireless signaling.

In FIG. 1, memory 102 receives data through logic or circuitry (not shown) in clock domain A. The data are read or removed from memory 102 by circuitry (not shown) in clock domain B. The logic of each clock domain operates according to different clock references or frequencies. Thus, the clock reference signal of clock domain A may be faster or slower than the clock reference signal of clock domain B. Illustratively, memory 102 is a circular FIFO (First-In, First-Out) buffer.

Write_Pointer 104 is maintained in clock domain A, while read_pointer 106 is maintained in clock domain B. The write and read pointers comprise indexes, counters or addresses indicating, respectively, the next memory position to be written to and the next memory position to be read from. Thus, by subtracting the value of read_pointer 106 from write_pointer 104 (e.g., wp−rp), one can determine how full memory 102 is.

In this embodiment of the invention, write pointer generator 110 is configured to maintain write_pointer 104, while read pointer generator 120 is configured to maintain read_pointer 106. Thus, write pointer generator 110 increments write pointer 104 each time a storage position in memory 102 is filled, while read pointer generator 120 increments read_pointer 106 each time a storage position is emptied or read.

When write pointer generator 110 increments, initializes or otherwise updates write pointer 104, it signals the value of the write pointer (e.g., an index, a counter, an address) to both converter 112 and synchronizer 114. Similarly, when read pointer generator 120 updates read pointer 106, it signals the value to converter 122 and synchronizer 124.

In this embodiment of the invention, the write and read pointer values are maintained (by generators 110, 120) in formats or representations other than binary code. For example, in one implementation of this embodiment, the pointer values comprise Gray codes. As one skilled in the art will recognize, according to the adjacency property of Gray codes, only one bit transition is required to signal an incremental increase in a value. Thus, each pulse signaling a new, incremented, value only differs from the previous pulse by the configuration of a single bit. In particular, even when wrapping around from a maximum signalable value (e.g., from 257 to 0 for an eight bit value), only one bit transition is required. By contrast, when a binary index or counter wraps around, all bits must transition (i.e., from all ones to all zeros).

However, Gray code values are not readily usable in mathematical calculations. Thus, while one Gray code may be compared to another to determine if they are the same or different, if they differ, one cannot readily determine how much they differ by simply by comparing them.

Converters 112, 122 are designed to convert the write pointer value and read pointer value, respectively, into a mathematically usable format. For example, if the pointer values are maintained with Gray codes, converters 112, 122 will convert the Gray code values into binary (or other usable format). Thus, instead of having to maintain multiple write and/or read pointer values—such as Gray code values to pass across clock domains as well as binary values for use in performing computations—only one of each is needed in this embodiment of the invention. The converters may comprise tables for translating a Gray code into a binary value, or vice versa, or may comprise logic configured to execute an algorithm for performing the conversion.

Synchronizers 114, 124 synchronize and transmit the values of write_pointer 104 and read_pointer 106, respectively, across the boundary between clock domain A and clock domain B. One configuration of a synchronizer is described further below.

Converters 116, 126 receive the write pointer and read pointer values, respectively, from the other clock domains. Similar to converters 112, 122, converters 116, 126 also are configured to convert or translate the pointer values from their native format (e.g., Gray codes) to binary or some other format useful in mathematical calculations.

Calculator 130 receives the converted write pointer value from converter 112, and the converted read pointer value from converter 126. Similarly, calculator 140 receives the converted read pointer value from converter 122, and the converted write pointer value from converter 116. Calculators 130, 140 then compare the pointer values to determine how full memory 102 is.

For example, the calculators may compute the difference of the write pointer and the read pointer. More particularly, they may compute the 2's complement of either the write pointer value or the read pointer value, and then add it to the other. This calculation may be used to determine whether and/or when to stop storing data in memory 102, whether and/or when to begin reading data from memory 102, or for some other purpose.

Illustratively, by having a fine-grained indication of how full the memory is, data flow and throughput can be controlled more precisely than if one could only tell if the memory was or was not full. For example, it may be more efficient or useful to stop storing data in the memory when there are a threshold number of empty storage positions remaining.

This embodiment of the invention has been described as it may be used to transmit a memory pointer value between clock domains. Other embodiments of the invention may be employed in virtually any system, apparatus or circumstance in which a value is transferred from one clock domain to another.

In one alternative embodiment of the invention, a pointer value may be maintained in binary or other mathematically significant form, but may be converted into Gray codes or another useful form to be transmitted into a different clock domain.

Figure 2:
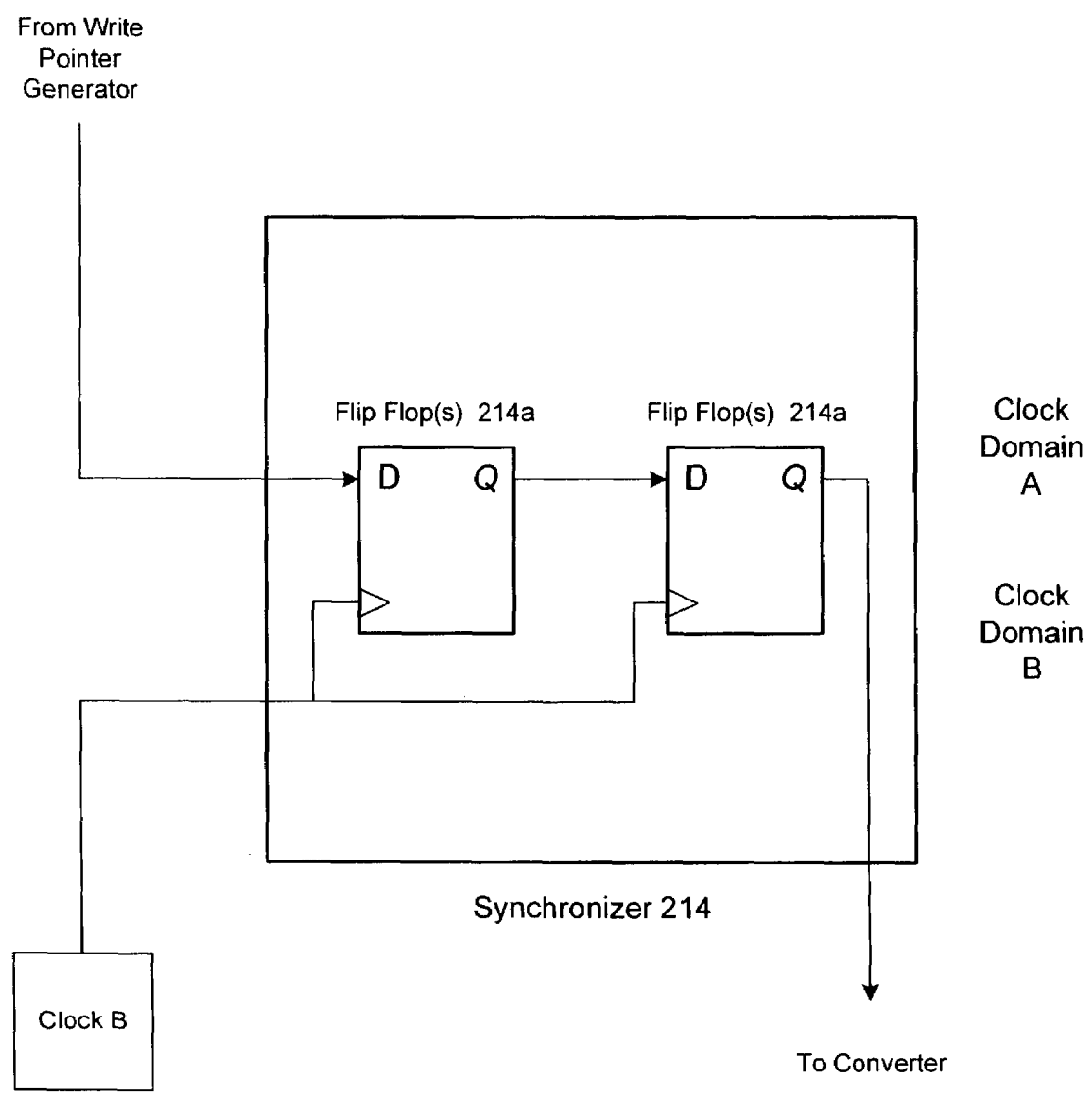
FIG. 2 is a block diagram depicting a synchronizer, in accordance with an embodiment of the invention.

FIG. 2 is a block diagram of a synchronizer for facilitating the transfer of a pointer value between clock domains, according to one embodiment of the invention. In this embodiment, a pointer value is being transferred from clock domain A to clock domain B.

Synchronizer 214 comprises two sets of D flip-flops 214a, 214b. The number of flip-flops depends on the number of signal lines for the pointer. Thus, if the pointer value is 8 bits in size, each set of flip-flops includes 8 flip-flops. Flip-flops 214a and 214b operate according to a clock reference provided by clock A and clock B, respectively.

In FIG. 2, a pointer value is received at flip-flops 214a (e.g., from write pointer generator 110 of FIG. 1). The pointer value is then received at flip-flops 214b, after which the value is forwarded to a converter (e.g., converter 116 of FIG. 1). In this embodiment of the invention, flip-flops 214a help ensure the pointer signal is settled down; flip-flops 214b allow the waveform of the signal to be accurately read. Two sets of flip-flops help avoid the meta-unstable state that may be perceived if only one set of flip-flops were used.

Because only one bit of the pointer value transitions between values, the setup time for the pointer signal is reduced. It can be therefore be assured that the output of synchronizer 214 will be either the correct, next, value of the pointer, or will repeat the previous value, depending on the difference between the two clock domains' clock frequencies. If the old pointer value is received, it can be ignored until the next value is received.

One algorithm for converting between Gray codes and standard binary code is as follows. First, the bits of a binary-coded value B[i] are labelled, where larger index values (i.e., larger values of i) represent more significant bits, and similarly label the corresponding Gray-coded value G[i]. Convert one to the other as follows:

(a) Copy the most significant bit.
(b) Then, for each smaller index value, do either:
 (i) G[i]=XOR(B[i+1], B[i]) {to convert binary to Gray}
 or (ii) B[i]=XOR(B[i+1], G[i]) {to convert Gray to binary}

In another embodiment of the invention, a conversion between a Gray code and a corresponding binary value is done via direct mapping. For example, the binary code equivalent of each Gray code may be stored. Then, to convert a specific Gray code into binary, the equivalent is retrieved from storage.

Figure 3:
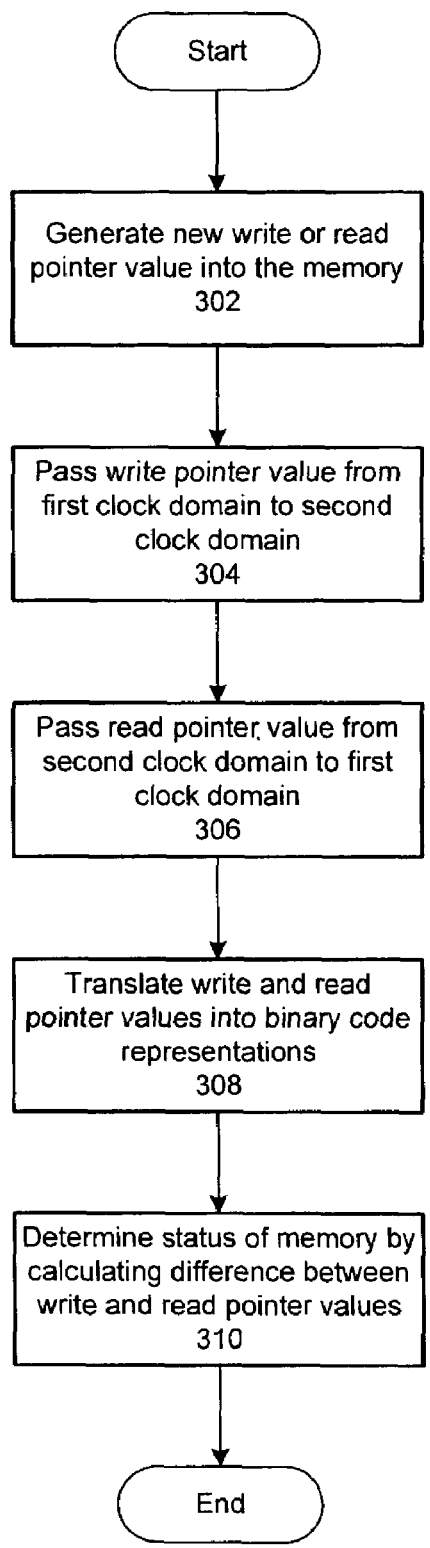
FIG. 3 is a flowchart demonstrating one method of determining a status of an asynchronous memory, according to one embodiment of the invention.

FIG. 3 is a flowchart demonstrating one method of determining a status of an asynchronous memory, according to one embodiment of the invention. In the illustrated method, pointers, indexes or counters identifying areas of the asynchronous memory are maintained in a non-binary code format (e.g., as Gray codes). Logic for writing to the asynchronous memory operates at a first clock rate, while logic for reading from the memory operates at a second clock rate.

In state 302 of FIG. 3, a new write pointer value (for identifying a next portion of the memory to be written to) and/or a new read pointer value (for identifying a next area of the memory to be read from) is/are generated.

In state 304, the write pointer value is communicated from the first clock domain to the second clock domain. In state 306, the read write pointer value is communicated from the second clock domain to the first clock domain.

In state 308, the write and read pointer values are translated or converted into binary code representations of the pointer values. This may be done with the aid of a translation table and/or logic configured to execute a conversion algorithm.

In state 310, a status of the memory is determined by comparing the binary code representations of the write and read pointer values. Illustratively, by taking the 2's complement of one of the binary code representations and adding it to the other, the result yields a measure of the number of memory storage areas that are or are not in use. This information may be used to determine whether to stop storing information in the memory (e.g., to avoid overwriting previously stored contents).

The foregoing embodiments of the invention have been presented for purposes of illustration and description only. They are not intended to be exhaustive or to limit the invention to the forms disclosed. Accordingly, the scope of the invention is defined by the appended claims, not the preceding disclosure.

What is claimed is:

1. A method of determining the status of an asynchronous memory, comprising:
 maintaining in a first clock domain a non-binary write pointer to an asynchronous memory;
 maintaining in a second clock domain a non-binary read pointer to the asynchronous memory;
 transferring a value of said non-binary write pointer to the second clock domain;
 transferring a value of said non-binary read pointer to the first clock domain; and
 calculating the difference between the value of said write pointer and the value of said read pointer to determine a status of the asynchronous memory.

2. The method of claim 1, further comprising:
 converting the value of said non-binary write pointer into binary; and
 converting the value of said non-binary read pointer into binary.

3. The method of claim 1, wherein one or more of the value of said non-binary write pointer and the value of said non-binary read pointer comprise Gray code values.

4. The method of claim 1, wherein said status of the asynchronous memory comprises a measure of a number of storage positions in said memory that are not in use.

5. The method of claim 4, further comprising comparing said measure to a threshold;
 wherein said threshold is greater than zero.

6. The method of claim 1, wherein said transferring the value of said non-binary write pointer comprises:
 reading the value of said non-binary write pointer at a first set of flip-flops, wherein said first set of flip-flops outputs to a second set of flip-flops; and
 at said second set of flip-flops, reading the value of said non-binary write pointer into said second clock domain.

7. A computer readable storage medium storing instructions that, when executed by a computer, cause the computer to perform a method of determining the status of an asynchronous memory, the method comprising:
 maintaining in a first clock domain a non-binary write pointer to an asynchronous memory;
 maintaining in a second clock domain a non-binary read pointer to the asynchronous memory;
 transferring a value of said non-binary write pointer to the second clock domain;
 transferring a value of said non-binary read pointer to the first clock domain; and
 calculating the difference between the value of said write pointer and the value of said read pointer to determine a status of the asynchronous memory.

8. A method of determining how full an asynchronous memory is, wherein the asynchronous memory is written to in a first clock domain and read from in a second clock domain, comprising:
 generating in said first clock domain, in a non-binary format, a write pointer to the asynchronous memory;
 generating in said second clock domain, in a non-binary format, a read pointer to the asynchronous memory;

transmitting a value of said non-binary write pointer from said first clock domain to said second clock domain through a first plurality of flip-flops;

transmitting a value of said non-binary read pointer from said second clock domain to said first clock domain through a second plurality of flip-flops;

in said first clock domain:
   converting the value of said write pointer from said non-binary format into a mathematically useful format; and
   converting the value of said transmitted read pointer from said non-binary format into said mathematically useful format;

in said second clock domain:
   converting the value of said transmitted write pointer from said non-binary format into said mathematically useful format; and
   converting the value of said read pointer from said non-binary format into said mathematically useful format; and calculating a difference, in said mathematically useful format, between the value of said write pointer and the value of said read pointer.

9. The method of claim 8, further comprising:
comparing said difference to a threshold, wherein said threshold is greater than zero.

10. A computer readable storage medium storing instructions that, when executed by a computer, cause the computer to perform a method of determining how full an asynchronous memory is, the method comprising:

generating in said first clock domain, in a non-binary format, a write pointer to the asynchronous memory;

generating in said second clock domain, in a non-binary format, a read pointer to the asynchronous memory;

transmitting a value of said non-binary write pointer from said first clock domain to said second clock domain through a first plurality of flip-flops;

transmitting a value of said non-binary read pointer from said second clock domain to said first clock domain through a second plurality of flip-flops;

in said first clock domain:
   converting the value of said write pointer from said non-binary format into a mathematically useful format; and
   converting the value of said transmitted read pointer from said non-binary format into said mathematically useful format;

in said second clock domain:
   converting the value of said transmitted write pointer from said non-binary format into said mathematically useful format; and
   converting the value of said read pointer from said non-binary format into said mathematically useful format; and calculating a difference, in said mathematically useful format, between the value of said write pointer and the value of said read pointer.

11. An apparatus for determining a status of an asynchronous memory, comprising:

a write pointer generator configured to maintain a write pointer for writing to the memory, wherein said write pointer comprises a non-binary value;

a read pointer generator configured to maintain a read pointer for reading from the memory, wherein said read pointer comprises a non-binary value;

one or more calculators configured to determine the numerical difference between said write pointer and said read pointer;

a first synchronizer configured to asynchronously transmit a value of said non-binary write pointer value from a first clock domain to a second clock domain; and a second synchronizer configured to asynchronously transmit a value of said non-binary read pointer value from said second clock domain to said first clock domain.

12. The apparatus of claim 11, wherein said first clock domain comprises:
   said write pointer generator:
   a first calculator; and
   one or more converters configured to convert one or more of the value of said non-binary write pointer and the value of said non-binary read pointer into binary.

13. The apparatus of claim 11, wherein said second clock domain comprises:
   said read pointer generator:
   a first calculator; and
   one or more converters configured to convert one or more of the value of said non-binary write pointer and the value of said non-binary read pointer into binary.

14. The apparatus of claim 11, wherein said write pointer generator maintains said write pointer only in said non-binary format.

15. The apparatus of claim 11, wherein said read pointer generator maintains said read pointer only in said non-binary format.

16. The apparatus of claim 11, further comprising:
   one or more converters configured to convert one or more of the value of said non-binary write pointer and the value of said non-binary read pointer into binary.

17. The apparatus of claim 16, wherein a first calculator is configured to compute a 2's complement of one of the value of said binary write pointer and the value of said binary read pointer.

18. The apparatus of claim 17, wherein said first calculator is further configured to sum said 2's complement of one of the value of said binary write pointer and the value of said binary read pointer and the other of the value of said binary write pointer and the value of said binary read pointer value.

19. The apparatus of claim 18, further comprising:
   a write enable signal configured to enable the memory to be written to;
   wherein said write enable signal is lowered if said sum is below a threshold; and
   wherein said threshold is greater than zero.

20. The apparatus of claim 11, wherein the size of the address space of the asynchronous memory is not equivalent to a power of two.

21. Logic configured to indicate the status of an asynchronous memory, the logic comprising:
   a first Gray code counter configured to identify a next location in the memory to be written to;
   a second Gray code counter configured to identify a next location in the memory to be read from;
   a first synchronizer configured to receive a value of the second Gray code counter;
   a second synchronizer configured to receive a value of the first Gray code counter; and
   calculation logic configured to determine a status of the memory from a binary code representation of the value of said first Gray code counter and a binary code representation of the value of said second Gray code counter value;

wherein said first Gray code counter and said first synchronizer operate at a first clock frequency; and wherein said second Gray code counter and said second synchronizer operate at a second clock frequency.

22. The logic of claim 21, further comprising:

a translation table configured to facilitate translation of a Gray code counter value into a binary code representation of the Gray code counter value.

23. The logic of claim 21, wherein said status comprises a number of cells of the memory not currently storing valid contents.

24. The logic of claim 21, wherein said status comprises a number of cells of the memory currently storing valid contents.

25. The logic of claim 21, wherein said calculation logic is configured to determine the difference between said binary code representation of the value of said first Gray code counter and the value of said binary code representation of said second Gray code counter.

26. An electronic device, comprising:

a memory;

logic operating at a first clock rate, wherein said logic is configured to maintain a write index into the memory to identify a next memory location to be written to;

logic operating at a second clock rate, wherein said logic is configured to maintain a read index into the memory to identify a next memory location to be read from;

conversion logic configured to convert a non-binary code representation of an index into the memory into binary code; and calculation logic configured to determine a status of the memory from binary code representations of the value of said write index and the value of said read index.

27. The electronic device of claim 26, wherein said write index and said read index comprise values represented in a code other than binary code.

28. The electronic device of claim 26, wherein said write index and said read index comprise Gray codes.

29. Logic indicating a state of a memory configured to pass data between a first region clocked at a first rate and a second region clocked at a second rate, the logic comprising:

a first counter configured to indicate a write location of the memory in said first region;

a second counter configured to indicate a read location of the memory in said second region; and a calculator configured to:

receive the value of said read location and the value of said write location; and calculate a fullness of the memory.

30. The logic of claim 29, wherein said first counter and said second counter are Gray code counters.

31. Logic for indicating a status of a memory, comprising:

a first Gray code module clocked at a first rate;

a second Gray code module clocked at a second rate;

one or more translation tables configured to convert between a Gray code value and a corresponding binary value; and a calculator configured to determine a status of the memory.

32. The logic of claim 31, further comprising:

a synchronizer configured to couple said first Gray code module to a first translation table.

33. The logic of claim 31, wherein the memory is a FIFO (First In, First Out) memory and said status reflects a fullness of the FIFO memory.

34. A method of indicating a status of a memory configured to transfer data between a first region clocked at a first rate and a second region clocked at a second rate, the method comprising:

updating a first Gray code counter value, wherein said first Gray code counter is clocked at said first rate;

updating a second Gray code counter value, wherein said second Gray code counter is clocked at said second rate;

passing the value of said second Gray code to the first region; and processing said first Gray code counter and the value of said second Gray code counter value to determine a status of the memory.

35. The method of claim 34, wherein said passing comprises:

transmitting said second Gray code counter value through a synchronizer clocked at one of said first rate and said second rate.

36. The method of claim 34, wherein:

said first Gray code counter value is configured to identify a first location in the memory; and said second Gray code counter value is configured to identify a second location in the memory.

* * * * *